Figure 1:
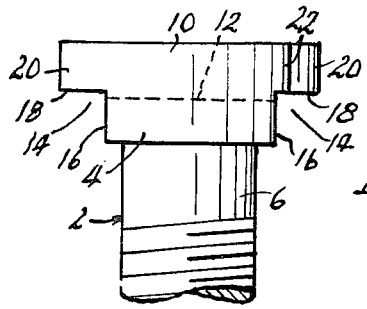

United States Patent [19]

Wilson

[11] 4,258,606
[45] Mar. 31, 1981

[54] SCREW

[76] Inventor: Leroy Wilson, P.O. Box 203, Manhattan, Kans. 66502

[21] Appl. No.: 38,585

[22] Filed: May 14, 1979

[51] Int. Cl.³ ............................................. F16B 31/02
[52] U.S. Cl. ...................................... 411/406; 411/6
[58] Field of Search ...................................... 85/45, 61

[56] References Cited

U.S. PATENT DOCUMENTS

| | | | |
|---|---|---|---|
| 1,395,592 | 11/1921 | Odom | 85/61 |
| 1,487,610 | 3/1924 | Schatzel | 85/45 |
| 2,755,699 | 7/1956 | Forster | 85/45 |
| 3,289,524 | 12/1966 | Rubin | 85/61 |
| 3,456,548 | 7/1969 | Schmidt et al. | 85/45 |
| 3,504,591 | 4/1970 | Christophersen | 85/61 |
| 3,709,087 | 1/1973 | Stone | 85/61 |
| 3,854,372 | 12/1974 | Gutshall | 85/61 |
| 4,176,786 | 12/1979 | Braukmann | 85/45 |

*Primary Examiner*—Francis K. Zugel
*Attorney, Agent, or Firm*—John A. Hamilton

[57] ABSTRACT

A screw adapted to be driven by an ordinary straight-bladed screwdriver, the head of the screw having a cylindrical socket formed in the top surface of the head thereof coaxially with the screw shank adapted to receive the driver blade therein, the wall of the socket preventing lateral slippage of the driver blade from the socket and permitting turning of the blade, portions of the wall being offset resiliently inwardly to inhibit turning of the blade, and so configured that a partial turn of the blade causes it to be gripped between portions of the offset wall to hold the screw releasably on the blade, so that the screw may be inserted in positions of difficult access, to resist rotation of the blade, more strongly after a further partial turn of the blade, whereby the screw may be driven by the blade with a suitable torque, and to yield completely on the application of a still greater torque, whereby to limit the maximum torque applicable to the screw by the screw driver.

8 Claims, 9 Drawing Figures

U.S. Patent  Mar. 31, 1981  4,258,606

SCREW

This invention relates to new and useful improvements in screws operable to be driven and set by screw drivers.

A primary object of the present invention is the provision of a screw operable to be driven and set by a screw driver which includes means operable to limit the maximum torque which may be applied thereto by the driver, in order to prevent damage which might otherwise occur either to the screw itself or to the parts joined thereby as a result of the application of excessive torque to the screw. The torque-limiting function is of course not unknown, usually heretofore requiring a special and relatively expensive screw driver, but in the present invention the torque-limiting elements are portions of the screw itself, thereby providing the desired function even with an ordinary straight-bladed screw driver.

Another object is the provision of a screw of the character described which provides, again by means included in the screw itself and cooperating with an ordinary straight-bladed screw driver, for securing the screw releasably to the driver blade. The screw, thus mounted, may be more easily inserted and started in positions of difficult access, into which it might be extremely tedious, if not almost impossible, to insert the screw manually. This screw-holding function has also usually required a special screw driver.

A further object is the provision of a screw of the character described which provides for the centering of the screw driver relative to the screw, and for the continuous maintenance of this centered relation at all times, preventing lateral disengagement of the driver from the screw head. Ordinary screw drivers often slip laterally from the driver slots of common screws, and cause marring and damage to nearly surfaces.

A still further object is the provision of a screw of the character described which provides all of the above described torque-limiting, screw-holding, and centering functions in an extremely simple and economical manner, being of one-piece integral form, with the head therof modified by readily available and economical means.

Figure 2:
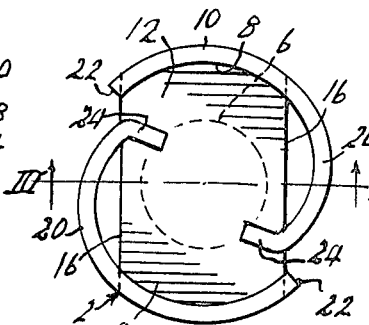
Figure 3:
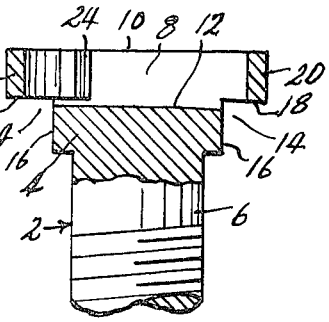
Figure 4:
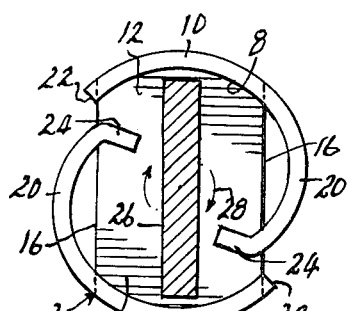
Figure 5:
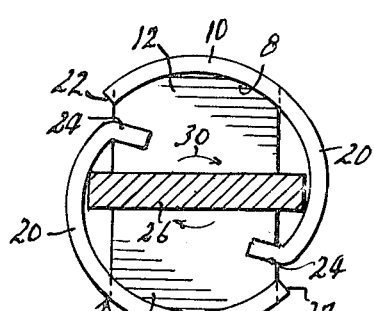
Figure 6:
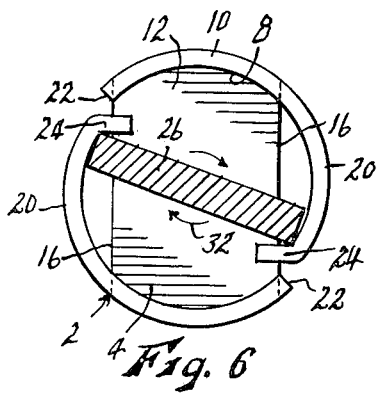
Figure 7:
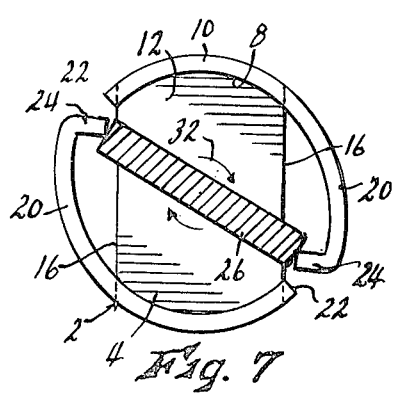
Figure 8:
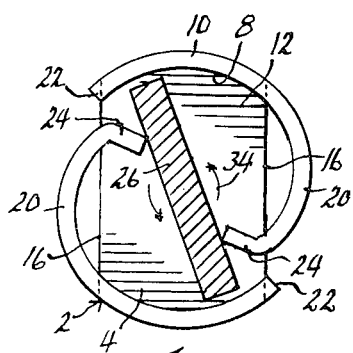
Figure 9:
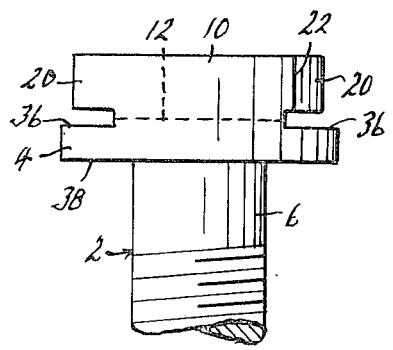

With these objects in view, as well as other objects which will appear in the course of the specification, reference will be had to the accompanying drawing, wherein:

FIG. 1 is a fragmentary side elevational view of a screw embodying the present invention, FIG. 2 is a top plan view of the head of the screw, FIG. 3 is a fragmentary sectional view taken on line III—III of FIG. 2, FIG. 4 is a view similar to FIG. 2, showing the initial insertion of the screw driver blade, FIG. 5 is a view similar to FIG. 4, showing the driver blade turned to a position such that the screw is held releasably on the driver, FIG. 6 is a view similar to FIG. 5, but showing the driver blade further turned to a position for driving and setting the screw, FIG. 7 is a view similar to FIG. 6, but showing the driver blade at the moment it is released by elements of the screw to limit the torque applicable to the screw by the driver, FIG. 8 is a view similar to FIG. 7, but showing the driver blade positioned for loosening and removal of the screw, and FIG. 9 is a view similar to FIG. 1, but showing a slight modification of structure.

Like reference numerals apply to similar parts throughout the several views, and the numeral 2 applies generally to a screw embodying the present invention, said screw including a head 4 and a straight threaded shank 6 integral with said head. Head 4 may initially be of flat, cylindrical form, coaxial with shank 6, modified as will presently be described. A cylindrical socket 8 is formed in the top surface of head 4, concentrically therewith, leaving an annular wall 10 surrounding the socket. The floor 12 of the socket is planar and normal to the screw axis. As shown in FIGS. 1–8, a right-angled notch 14 is formed in the lower portion of head 4 at diametrically opposite sides thereof, the vertical walls 16 of said notches being parallel and spaced apart by a distance at least greater than the diameter of shank 6, and the downwardly facing horizontal walls 18 of said notches being coplanar and spaced slightly above the floor 12 of socket 8, whereby portions 20 of wall 10 of the socket are severed from the head at their lower edges, the severed portions being those disposed within notches 14. As shown, the total combined angular extent of portions 20 is about one half the total circumference of wall 10, but this proportion is exemplary only.

At diametrically opposite points 22, wall 10 is vertically severed. Points 22 are disposed at angularly corresponding ends of notches 14, whereby each wall portion 20 is left integrally secured to the screw head at only one end, its length being otherwise separated from the screw head. If the metal of which the screw is formed is normally resilient, each wall section 20 thus constitutes a cantilevered leaf spring secured to the head at only one end, with the two springs extending in the same angular direction relative to the screw axis. From its attached end, each spring 20 is curved generally spirally inwardly, the curvature being relatively gradual along a major portion of the length of the spring, but with the extreme free end portion bent sharply inwardly to form an angular ear 24. The spiral curvature of the curved portions of springs 20 should be such that the free ends thereof, at their junctures with ears 24, should normally be spaced apart by a distance at least less than the width of the blade 26 of an ordinary straight-bladed screw driver adapted to be inserted freely into socket 8 between undisturbed portions of socket wall 10, as shown in FIG. 4. Springs 20 extend from their attached ends in the direction of the screw threads, that is, in a clockwise direction for right-handed screws, and in a counter-clockwise direction for left-handed screws. The included angle between the curved portion and ear 24 of each spring should be at least somewhat greater than 90 degrees.

In the use of the screw, the screw driver blade 26 is first inserted into socket 8 of screw head 4 as shown in FIG. 4, with the width of the blade extending between undisturbed portions of wall 10 still integral with the head at their lower edges. Diametrically opposite points of wall 10 are spaced apart amply in these regions to receive the driver blade therebetween. Of course, a driver blade of approximately the correct width should be used. The driver is then turned in a clockwise direction, as indicated by arrows 28, coaxially relative to the screw, to a position such as shown in FIG. 5, wherein the sides of blade 26 engage springs 20 of the screw and separate them resiliently to some degree. The curved portions of the springs become progressively closer together in this angular direction, and the width of blade 26 should be such that its opposite edges engage both of the springs before it engages the ears 24 of the springs. The screw is then held frictionally in a fixed but yieldable position relative to the driver by the grip of springs 20 thereon, with sufficient security to support the weight of the screw. This is the "screw-holding" relationship of the driver to the screw. Then, using the screw driver itself as a tool, the screw may be easily inserted and started, even in positions to which access is difficult.

After the screw is started and the turning thereof becomes progressively more difficult, driver blade 26 will turn further in the direction of arrows 30 to the position shown in FIG. 6, wherein its side edges engage ears 24 of the springs. These ears are inclined much more sharply relative to the direction of angular movement of the blade edges than the curved portions of the springs, and hence strongly resist further turning of the driver blade in this direction. In this position, therefore, sufficient torque may be applied to the screw by the driver to set the screw properly. Nevertheless, ears 24 of the spring are still inclined forwardly relative to the direction of angular movement of the driver blade edges, and therefore a still greater torque applied to the driver blade, in the direction of arrows 32 in FIGS. 6 and 7, flexes the springs still further outwardly, although the inclination of the ears requires a greater driver torque to accomplish it, until, at a given torque, the springs are flexed outwardly to a sufficient degree that blade 26 can pass between the inner tips of ears 24 as shown in FIG. 7. This limits the maximum torque which can be applied to the screw by the driver, and thus eliminates the possible damage, either to the screw on to the parts joined thereby, which could be caused by the application of still greater and excessive torques to the screw.

The "release" torque necessarily applied to the driver blade to move it to the FIG. 7 position depends on several factors, such as the length and cross-sectional area of the curved portions of springs 20, the length and angularity of the ear portions 24 of the springs, and the physical characteristics, particularly as to resiliency, of the metal of which the screw is formed. By properly interrelating these factors, a release torque sufficiently accurate for all practical purposes may be obtained. The width of the blade 26 of the screw driver used is of course also a factor, but most screws already require a driver having a blade of approximately a given width for efficient use therewith, and the present screw configuration would not change this requirement. The metal of which most screws are commonly formed has sufficient resilience for the purposes described, at least if the screw is intended to be set only once, since the strain on the springs is unidirectional and it consequently makes little difference whether they return completely to their original positions after yielding to the driver blade. However, if the screw is intended for repeated insertions and removals, a screw metal of greater resilience might be required. For example, a steel screw could be formed of a steel having a higher carbon content, and/or tempered.

If it is desired to remove the screw, the driver blade 26 is again inserted into socket 8 as shown in FIG. 4, but turned in an opposite direction, as indicated by arrows 34 in FIG. 8, until it engages the tips of spring ears 24, whereby to apply a removing torque to the screw. The maximum torque applicable in this direction is much greater than is applicable in the clockwise direction, since springs 20 are now loaded in a generally longitudinal direction, rather than laterally as before, and hence would yield only to a much greater force. The removal of a screw, once it has become solidly set, usually requires a considerably greater torque than was originally required to set it.

FIG. 9 shows a slight modification of formation in which, in place of notches 14, there are formed a pair of inwardly directed slits 36 at diametrically opposite sides of the head, intermediate the top and bottom of the head, the vertical thickness of these slits extending slightly above and slightly below the floor 12 of socket 8. They do not open through the bottom surface of head 4 as do notches 14. The operation of this FIG. 9 species of the screw is identical to that of FIGS. 1-8, but it has the advantage of leaving the lower surface 38 of the head uninterrupted, flat, planar and normal to the screw axis. Thus said surface is less likely to damage or mar a work surface than if it were in the form of a parallel-sided bar as in FIGS. 1-8, and cooperates more efficiently with any washer which may be positioned between the screw head and the work surface.

It will be seen that wall 10 surrounding socket 8, including the fixed portions thereof and the portions thereof forming springs 20, form a virtually uninterrupted "fence" around the socket at all times. This fence prevents the driver blade from slipping laterally out of engagement with the screw, as they often do from the straight, open-ended slots of ordinary screws, and thus prevents a common cause of screw driver damage to work pieces. Also, while I have shown my invention as applied to a cylindrically headed cap screw, it will be obvious that it could be applied to screws of nearly any other type, with minor and obvious modifications of configuration.

While I have shown and described a specific embodiment of my invention, it will be readily apparent that many minor changes of structure and operation could be made without departing from the spirit of the invention.

What I claim as new and desire to protect by Letters Patent is:

1. A screw adapted to be driven by an ordinary screwdriver having a flat blade, said screw including a threaded shank and an enlarged head, the outer end surface of said head being substantially flat and having a generally cylindrical socket formed therein concentrically to the screw axis to receive said screwdriver blade coaxially therein, a portion of the wall of said socket forming a cantilevered leaf spring affixed at one end at the periphery of said socket and being curved, toward its free end, progressively further radially into said socket toward the axis of the screw, to a diametrically spaced relation from the opposite wall of said socket less than the width of said screwdriver blade, whereby when said screwdriver blade is inserted into said socket and turned coaxially with the screw, it will become wedged between said leaf spring and said opposite socket wall to apply a turning torque to said screw, the maximum torque applicable by the driver to the screw being limited to that occuring when the driver blade has deflected said spring outwardly sufficiently to allow said blade to pass the free end of said spring.

2. A screw as recited in claim 1 wherein said screw head includes a pair of said cantilevered leaf springs, said springs extending in the same angular direction relative to the screw axis and having their free ends disposed at diametrically opposite points of said head.

3. A screw as recited in claim 2 wherein said leaf springs extend, from their fixed toward their free ends, in the same direction as the threads of the screw shank, that is, clockwise for right-handed screws and counter-clockwise for left-handed screws.

4. A screw as recited in claim 3 wherein said leaf springs curve inwardly relatively gradually along a major portion of their lengths, whereby when the driver blade is turned sufficiently to engage these gradually curved spring portions, they are deflected outwardly relatively easily to grip said blade frictionally therebetween to support said screw yieldably on the driver, and wherein the free end portions of said springs are angled more sharply inwardly to form ears offering greater resistance to rotation of said driver blade in said socket, whereby to increase the driver torque required to deflect said springs outwardly when said blade engages said ears.

5. A screw as recited in claim 4 wherein the ear portion of each of said springs is angled obtusely to the more gradually curved part of said spring at its point of juncture therewith.

6. A screw as recited in claim 2 wherein the screw head provides a raised annular wall surrounding said socket, whereby to prevent lateral slippage of the driver blade out of engagement with said screw, each of said springs being formed by a portion of said wall severed from the remainder to said head except at one end thereof.

7. A screw as recited in claim 6 wherein the entire screw, including the shank, head and springs, is of one-piece integral form.

8. A screw as recited in claim 1 wherein said socket is provided with a planar floor normal to the screw axis, and the head provides a raised annular wall surrounding said socket, diametrically opposite portions of said wall being separated from said head except at one end of each, the points of remaining attachment being at diametrically opposite points of the screw, each of said separated wall portions constituting one of said leaf springs, each of which is curved relatively gradually inwardly in generally spiral form, in closely spaced relation above the floor of said socket, to a point adjacent but spaced apart from its free end, the remaining free end portion of each spring being angled more sharply inwardly to form an ear angled at least slightly obtusely to the spirally curved portion of the spring at its point of juncture therewith, the free ends of said spring ears being disposed at diametrically opposite points of said head.

* * * * *